United States Patent Office 2,861,864
Patented Nov. 25, 1958

2,861,864

PROCESS OF BLEACHING SOLID GELLED ACRYLONITRILE POLYMERS WITH ACIDIFIED CHLORITE AND OXALIC ACID BATHS

Allan O. Mogensen, Stamford, Conn., assignor to American Cyanamid Company, New York, N. Y., a corporation of Maine No Drawing. Application August 23, 1955
Serial No. 530,189

7 Claims. (Cl. 8—108)

This invention relates to the treatment of polymeric compositions and more particularly to certain new and useful improvements in methods of treating polymers and copolymers of acrylonitrile in order to remove color therefrom. The invention is especially concerned with the bleaching of shaped products, for example, in the form of filaments (mono- and multifilaments), rods, tubes, films, ribbons, sheets, etc., and which are composed or formed of homopolymeric acrylonitrile or of a copolymer of acrylonitrile containing an average of at least about 80% by weight thereof of acrylonitrile combined in the copolymer molecules.

Various methods of producing filaments, films and other shaped articles from polyacrylonitrile (homopolymeric acrylonitrile) and from copolymers or interpolymers of a major proportion of acrylonitrile and a minor proportion of another monomer or monomers heretofore have been suggested, for example, in U. S. Patents 2,117,210; 2,140,921 and 2,404,713-728. Other patents are Cresswell U. S. Patent 2,533,224, dated December 12, 1950; Cresswell U. S. Patents 2,558,730, -1, -2, -4 and -5, all dated July 3, 1951; Cresswell and Wizon U. S. Patent 2,558,733 and Pollard U. S. Patent 2,558,781, each dated July 3, 1951; and, for instance, British Patents 714,530; 715,915; 729,472 and 732,135. The patents identified in the preceding sentence describe other and more specific methods of producing shaped polymers and copolymers of acrylonitrile (e. g., in fiber form), and to the treatment of which the present invention is especially applicable for the purpose of improving their color and/or their color stability under heat.

In amplification of the foregoing paragraph it may be stated that British patent specification No. 714,530 (complete specification published September 1, 1954) discloses the production of freshly extruded articles such as threads, fibers, filaments, staple fibers, ribbons and films from solutions of a polymer of acrylonitrile by extruding the solution into a water bath, which may be cooled to a temperature not exceeding $+10°$ C. as described in British patent specification No. 732,135, or which may be at ordinary temperatures, namely, $15°$ C. to $25°$ C. The solution which is extruded is "a solution of a polymer of acrylonitrile containing in the polymer molecule not less than 80 percent by weight of acrylonitrile in a solvent mixture consisting essentially of water, at least one water-miscible aliphatic liquid containing one alcoholic hydroxyl group and not more than 6 carbon atoms in the molecule, and at least one highly water-soluble salt selected from the alkali metal thiocyanates, the alkaline earth metal thiocyanates, ammonium thiocyanate, guanidine thiocyanate, lithium bromide, lithium iodide, sodium iodide and zinc chloride, the said salt constituting at least 35 percent by weight of the solvent mixture." The ratio of the weight of water to the weight of the aliphatic liquid in the solvent mixture preferably lies in the range of from 2:1 to 1:4. The following compounds are given as examples of suitable liquids containing an alcoholic hydroxyl group: methyl alcohol, ethyl alcohol, ethylene glycol monomethyl and monoethyl ethers, diacetone alcohol and ethyl lactate. In the freshly extruded article, as will be apparent to those skilled in the art, the liquid phase thereof is comprised of water while the solid polymeric phase of the said article is composed essentially of the polymer of acrylonitrile.

British patent specification No. 715,915 (complete specification published September 22, 1954) corresponds to U. S. Patent No. 2,777,751, dated January 15, 1957. The invention involves the use of an aqueous coagulant comprising an aqueous solution containing from 3% to 25% by weight of a water-soluble thiocyanate which yields highly hydrated ions in an aqueous solution.

British patent specification No. 729,472 (complete specification published May 4, 1955) discloses the production of freshly-extruded "threads" of "polyacrylonitrile," as these terms are defined in the specification, by extruding a solution of the polyacrylonitrile dissolved in a solvent mixture consisting essentially of water, a water-miscible diluent and one or more highly water-soluble salts selected from the same group described in the aforementioned British patent specification No. 714,530 (the salt constituting at least 35% by weight of the solvent mixture) into a coagulant bath consisting of an aqueous solution containing the same salt and the same diluent in substantially the same relative proportions as they are present in the polymer solution. The relative proportions of the aforesaid salt and diluent are such that the bath contains at least 10% by volume of the solvent mixture used to dissolve the polymer. The concentration of the salt and diluent in the coagulating bath are maintained below that at which spinning of the polymer solution would break down. The preferred diluents are the alcoholic type of liquids described in British patent specification No. 714,530, but other diluents also may be used, specific mention being made of acetone and acetonitrile. In the freshly extruded article, as here too will be apparent to those skilled in the art, the liquid phase thereof is comprised of water and the aforementioned water-miscible diluent, while the solid polymeric phase of the said article is composed essentially of the aforesaid polyacrylonitrile.

British patent specification No. 732,135 (complete specification published June 22, 1955) discloses the production of freshly extruded "threads" of "polyacrylonitrile," as those terms are defined in the specification, by extruding a solution of the polyacrylonitrile, dissolved in a concentrated aqueous solution of a water-soluble salt which yields highly hydrated ions in aqueous solution, into an aqueous coagulating bath in which at least 5% by weight of the aforesaid water-soluble salt is dissolved, the said bath also containing a water-miscible alcohol, specifically methanol or ethanol. Examples of suitable water-soluble salts are sodium, calcium and zinc thiocyanates, and others such as are mentioned in the above-identified British patent specifications. In the freshly extruded article, as will be obvious to those skilled in the art, the liquid phase therefor is comprised of water and the aforesaid water-miscible alcohol, specifically methanol or ethanol, while the solid polymeric phase thereof is composed essentially of the aforesaid polyacrylonitrile.

My invention is particularly useful in bleaching, that is, in removing objectionable color bodies (inherent, normally occurring discolorations), from gelled acrylonitrile polymers (e. g., such polymers in aquagel or hydrogel state), which contain an average of at least 80% by weight of acrylonitrile in the polymer molecules and which are produced as described in, for example, the aforementioned Cresswell and Cresswell et al. patents. The methods therein disclosed and claimed generally involve precipitating or coagulating the acrylonitrile polymerization product in approximately its desired shape from a water-coagulable solution thereof, e. g., a solution of the polymer in a concentrated aqueous salt solution of the kind disclosed by Rein in his aforementioned U. S. Patent No. 2,140,921. The precipitation is effected by contacting the solution (e. g., immediately after extrusion through a spinnerette) with a cold, liquid coagulant comprising water, more particularly such a coagulant which is at a temperature not substantially exceeding +10° C. The shaped, precipitated gels, e. g., extruded, water-swollen (aquagel) filaments, which have been formed in a cold liquid coagulant comprising water or a mixture of water and a lower aliphatic monohydric alcohol, at a low temperature (e. g., −15° C. to +10° C.) can be materially improved in properties by subjecting the precipitated material in wet, swollen state to tension, as by stretching, in contact with moisture or water and at an elevated temperature, specifically at a temperature within the range of about 70° C. to about 110° C.

Yarn produced from a polymer of acrylonitrile by the wet-spinning processes described in the aforementioned Cresswell and other patents has excellent physical properties, but in many cases it is not sufficiently free from color to meet the exacting requirements of the textile industry. The color may vary, for instance, from light or dark yellow to golden brown, and may occur or develop either prior to or during the polymerization or copolymerization of the acrylonitrile, during the formation of a solution thereof, or during the spinning or shaping of the polymerization product from solution state. The formation of color in the acrylonitrile polymerization product may be due to various causes, e. g., as a result of excessive heat or oxidation by air, or a combination of both, or from other causes. It will be understood, of course, that the terms "color" and "colored" as used herein and in the appended claims with reference to the acrylonitrile polymerization product mean the color which is inherent therein as distinguished from an added color body such as a dye, pigment or the like.

One solution to the problem of removing objectionable color from polymers and copolymers of acrylonitrile is suggested in U. S. Patent No. 2,432,447. The method therein described involves subjecting the colored yarn or other article, after it has been dried, to treatment with an aqueous hypochlorous acid solution. Another method, which is disclosed in U. S. Patent No. 2,432,448 involves subjecting the colored article in gel state to treatment with either an aqueous solution of hydrogen peroxide (1% to 10% concentration by weight) or of hypochlorous acid in a concentration corresponding to from 0.05% to 0.5% by weight of available chlorine. It also has been suggested (see French Patent 918,532 or corresponding British Patent 615,385) that products made from vinyl derivatives, specifically polyvinyl chloride threads or fabrics made therefrom, a cloth made from fibers produced from a copolymer of vinyl chloride and vinyl acetate, and fibers made from afterchlorinated polyvinyl chloride, be bleached by treatment with an aqueous, acidic solution of a chlorite, specifically sodium chlorite.

The present invention is based on my discovery that color can be expeditiously and economically removed from a colored article composed of a polymer of acrylonitrile containing at least 80% by weight of acrylonitrile combined in the polymer molecules by subjecting the said article in gel state to treatment by immersion in a plurality of individual baths having different compositions. One of the baths is an acidified aqueous solution of a water-soluble chlorite, e. g., sodium chlorite, in a concentration of at least 0.07% by weight thereof and another of the baths is an aqueous solution of oxalic acid in a concentration of at least 0.02% by weight thereof. Each of the baths is at a temperature ranging from 20° C. to 100° C., advantageously within the range of from about 40° C. to about 80° C. After removal of the article from the first of the baths in which it is immersed, it is washed (more particularly with a washing agent comprising water) prior to immersion in the other of the aforesaid baths. Washing is generally continued for a period sufficient to remove substantially all water-soluble components that would harmfully contaminate the second treating bath. The article is immersed in each of the treating baths for a total time sufficient to effect bleaching thereof as evidenced by the lighter color of the dried article. This time may range, for instance, from 2 minutes to 2 or more hours (e. g., from 1 minute to ¼–1 hour in one bath and the remaining time in the other bath).

In practicing the invention the order in which the treating baths are employed may be varied as desired or as may be required by operating or other conditions. In other words, the article may be immersed first in the acidified aqueous solution of water-soluble chlorite, washed after removal from said bath, and thereafter immersed in a bath of the specified aqueous solution of oxalic acid; or the reverse order may be employed. The series of steps of treating with one of the said agents, washing and then with a second of the said agents may be repeated as many times as may be desired or as may be required. Optimum results have been obtained by treating the article first in the water-soluble chlorite bath and subsequently in the bath of the aqueous solution of oxalic acid. Hence this order is the preferred procedure.

The water-soluble chlorite may be either chlorous acid itself or it may be a water-soluble salt of chlorous acid, for example, sodium, potassium or any of the other alkali-metal chlorites, a chlorite of an alkaline-earth metal, specifically barium, strontium or calcium chlorite, or such water-soluble chlorites as zinc, cadmium or nickel chlorite. Sodium chlorite is the preferred water-soluble chlorite because of its present commercial availability and relatively low cost.

If the water-soluble chlorite is sodium chlorite or other water-soluble salt of chlorous acid, then the aqueous solution containing the said chlorite should be acidified prior to immersion of the colored article therein. The kind and amount of acid required to form the acidified solution may be considerably varied. Organic acids are generally preferred to mineral acids, and acetic acid has been found to be especially desirable for this purpose. The use of strong mineral acids such as sulfuric and hydrochloric acids is not precluded, but generally pH control with such acids is more difficult than with an organic acid such as acetic acid; furthermore, the strong mineral acids introduce an added corrosion problem. Phosphoric acid is an example of another mineral acid that can be used if desired, but its use also is less to be preferred than acetic acid, chloroacetic acid or similar acids. The pH of the acidified aqueous solution may be considerably varied, e. g., from 2 to 6, but usually will be within the range of from about 3 to 5, preferably from 3 to 4.

The concentration of the water-soluble chlorite in the aqueous solution should be at least 0.07% by weight thereof. The upper limit of concentration is of lesser importance other than from an economic standpoint. Usually the maximum concentration of water-soluble chlorite in the aqueous solution will be about 2.0% by weight thereof, but the use of higher concentrations is not precluded. In general, the bleaching activity of the aqueous solution containing the water-soluble chlorite varies directly with an increase in the concentration of the solution and an increase in temperature of the bath, and inversely with the pH of the solution. Hence, when it is desired to shorten the time of immersion of the colored article in the chlorite treating bath, it is frequently possible to accomplish this result by increasing the concentration of the water-soluble chlorite in the bath. It is generally desirable to keep the concentration of chlorite within a reasonable maximum limit in order to minimize the evolution of chlorine dioxide from the bath which may be objectionable from a disposal standpoint or from the standpoint of excessive hazard to the health of workmen.

The concentration of oxalic acid in the other treating bath should be at least 0.02% by weight thereof while the upper limit of concentration may be widely varied, depending largely upon economic considerations and the degree to which it is desired to improve the color of the dried article and/or its resistance to discoloration under heat. In general, the upper limit of concentration of oxalic acid in the aqueous solution is about 2.0% by weight of the solution.

The solution containing the water-soluble chlorite and/or the solution containing the oxalic acid also may contain other additives in addition to the chlorite and oxalic acid components, for instance, surface-active or wetting agents, dye assistants, antistatic agents or other textile-treating or finishing agents whereby the properties of the dried article in filamentary or other form are modified. A corrosion inhibitor also may be incorporated in, for example, the solution of chlorite, if desired.

Illustrative examples of surface-active agents that may be incorporated in either or both of the aforementioned primary treating or bleaching solutions are:

Sodium salt of sulfated dodecyl alcohol
Sodium salt of a sulfated unsaturated fatty acid
Dodecyl benzene sodium sulfonate
Nytron, which is understood to be a complex mixture of sulfonated ketones, amines and alkyl sulfamates
Dioctyl sodium sulfosuccinate
An alkyl aryl sulfonate (e. g., the product sold under the trademark name of "Nacconol NR")
Sodium salt of sulfated dodecyl alcohol The surface-active agent may be either of the anionic or cationic types, but preferably is anionic. Examples of other surface-active agents that can be used as additives to either or both of the aforementioned solutions are given in the publication "Soap and Sanitary Chemicals," August, September and October 1949, more particularly a series of articles appearing therein by John W. McCutcheon entitled, "Synthetic Detergents—Up to Date." The amount of surface-active agent can be varied as desired or as conditions may require, for instance, from 0.001% to 0.5% by weight of the solution.

Homopolymeric acrylonitrile and copolymers of acrylonitrile containing in the polymer molecules an average of at least 80% by weight of the acrylonitrile, and which are objectionably discolored, are treated as herein described in order to improve the color of the product. The expression "a polymer of acrylonitrile containing at least 80% by weight of acrylonitrile combined in the polymer molecules," as used herein and in the appended claims, means a polymerization product (homopolymer, copolymer or interpolymer or mixture thereof) containing in its molecules an average of at least 80% by weight of the acrylonitrile unit, which is considered to be present in the individual polymer molecule as the group

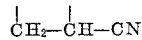

or, otherwise stated, at least 80% by weight of the reactant substance converted into and forming the polymerization product is acrylonitrile (combined acrylonitrile).

Illustrative examples of monomers which may be copolymerized with acrylonitrile to yield a polymerization product (copolymer or interpolymer) containing in the polymer molecules an average of at least 80% by weight of acrylonitrile are compounds containing a single $CH_2=C<$ grouping, for instance, vinyl acetate, vinyl chloride, methyl acrylate, styrene, acrylic acid, methacrylic acid, methacrylonitrile, acrylamide, methacrylamide and the like. Other examples are given in the aforementioned Cresswell patents and in the other patents identified hereinbefore.

The colored acrylonitrile polymerization products in gel state may be treated by batch, semi-continuous or continuous methods. For instance, a yarn of a polymer or copolymer of acrylonitrile after it has been wet spun and while it is still in a gel state may be bleached by continuously passing the yarn through a series of first bleach-wash-second bleach baths of the kind herein involved, at a rate such that the time of contact of the yarn with the individual treating (bleaching) solution is sufficiently long to secure the desired bleaching effect. The yarn may be given other supplementary treatments (e. g., treatment with a "finishing" emulsion) if desired or required, and then collected on a bobbin, in a bucket or by means of any other collecting device. The yarn in gel state also may be collected on a bobbin, in a bucket or by any other means, and while in gel form on or in the collecting device may be subjected to treatment with the individual bleaching solutions, for example, by immersion in individual baths of each solution, or the collecting bobbin may revolve in individual sprays of each solution. After one treating solution has been applied, the gel is washed before being further treated. The treatment may be effected before or after the elongation of the yarn to orient the molecules, or all or part of the applied stretch may be imparted to the yarn while it is passing through a series of baths of the solutions herein described. Preferably, however, the yarn is subjected to the bleaching treatment of this invention after it has been stretched to effect molecular orientation along the fiber axis. In all cases the discolored yarn in continuous filament, staple fiber or other form, or other shaped or unshaped acrylonitrile polymerization product having an objectionable, inherent or developed color, is bleached while it is still in a gel state, more particularly in a water-swollen or aquagel (hydrogel) state, and before it has been irreversibly dried. After receiving the aforementioned treatments, it may be further processed and/or treated in gel state, and finally dried, e. g., by allowing it to stand at room temperature or by heating at temperatures of the order of 40° C. to 100° C. or higher The present invention is applicable to the treatment of filaments (mono- and multifilaments), rods, tubes, bars, films, ribbons, sheets, staple fiber (long and short length) and other forms of gelled (undried) acrylonitrile polymerization products containing an average of at least about 80% by weight of acrylonitrile combined in the polymer molecules. The bleached products have improved color over the acrylonitrile polymerization products which are subjected to treatment, but otherwise the physical properties are substantially the same as those of the unbleached materials.

In order that those skilled in the art may better understand how the present invention may be carried into effect, the following examples are given by way of illustration and not by way of limitation. All parts and percentages are by weight.

EXAMPLE 1

Skeins of gelled tow of a copolymer of about 95% acrylonitrile and 5% methyl acrylate are treated as described below and are compared, after drying, with an untreated sample of the same material. The filamentary material (tow) in gel state is produced from a spinning solution of the kind and in the manner described in the aforementioned Cresswell patents.

A. No treatment; gelled tow is merely air-dried.
B. Treatment for 5 minutes in a 60° C. aqueous solution acidified to a pH of 4 with acetic acid and containing (a) 15 g. per liter of commercial sodium chlorite sold under the name of Textone by Mathieson Chemical Corporation, Baltimore 2, Maryland, and which is said to contain about 76% $NaClO_2$; and (b) 2 g. per liter of a surface-active agent, specifically Nacconol NR. Treated tow is washed with water and then air-dried.
C. Treatment for 5 minutes in a 60° C. aqueous solution containing 1 g. per liter of oxalic acid. Treated tow is air-dried.

D. Treatment first for 5 minutes with the aqueous solution described under B, followed by washing with water, then for 5 minutes with the 60° C. oxalic acid solution described under C, followed by washing with water, and finally air-drying the treated tow.

The dried samples are then examined colormetrically, that is, the values for "brightness" and "yellowness" are ascertained on both the air-dried samples and after heating for 6 hours at 135° C. The results are given in Table I.

*Table I*

| Test | Brightness | | Yellowness | |
|---|---|---|---|---|
| | Original | After heating for 6 hours at 135° C. | Original | After heating for 6 hours at 135° C. |
| A | 71.6 | 58.0 | 0.215 | 0.395 |
| B | 72.2 | 50.2 | 0.151 | 0.497 |
| C | 71.5 | 60.8 | 0.175 | 0.327 |
| D | 74.3 | 56.7 | 0.137 | 0.359 |

The values for brightness given in Table I and elsewhere herein are values for percent reflectance at a wave length of 550 millimicrons against a block of magnesium carbonate. The reflectance measurements are obtained by means of a recording photospectrometer produced and sold by the General Electric Company, Schenectady, New York.

The values for yellowness in Table I and elsewhere herein are obtained by a method which is the same as that described in Federal Specification TT–P–141b for "Paint, Varnish, Lacquer and Related Materials," and which is used extensively in the surface-coatings field. The method is based on measurements taken by means of a Hunter reflectometer, but tri-stimulus values can be converted to Hunter values, thereby to obtain comparable figures for yellowness.

The higher the brightness values in the tabulated data herein, the greater the improvement in the color; and the lower the value for yellowness, likewise the greater the improvement in the color.

From the data tabulated in Table I it will be noted that Test D, wherein was utilized the process of this invention, gave an improvement in color, when tested on the samples as originally produced (that is, prior to heating for 6 hours at 135° C.) that was substantially better than that of the untreated sample or either of the other treated samples.

EXAMPLE 2

Example 1 is repeated, substituting for the gelled tow formed of the copolymer described in that example, a gelled tow formed of homopolymeric arcylonitrile. Similar results are obtained.

EXAMPLE 3

This example illustrates the results obtained when the order of treatments is varied. The same gelled tow of acrylonitrile-methyl acrylate copolymer is treated as in Example 1 for the same time (5 minutes) and at the same solution temperature (60° C.) as in that example. The procedures are summarized below:

E. Same as in D of Example 1.

F. Treatment first with oxalic acid solution containing 1 g. per liter of oxalic acid, rinsed with water, followed by treatment with the chlorite solution described under B of Example 1, and finally air-drying the treated tow.

The results are given in Table II.

*Table II*

| Test | Brightness | | Yellowness | |
|---|---|---|---|---|
| | Original | After heating for 6 hours at 135° C. | Original | After heating for 6 hours at 135° C. |
| E | 74.4 | 52.4 | 0.107 | 0.390 |
| F | 78.8 | 48.0 | 0.134 | 0.389 |

The differences in color values shown in Table II are, with the exception of the last column of data, material differences and not merely differences in degree or within experimental error. They constitute strong evidence that the results of the combination of the hereindescribed chlorite and oxalic acid solutions are not merely additive and what normally would be expected, since, if additive, the color values of the products of Tests E and F should be the same. They are obviously not the same.

EXAMPLE 4

Example 1 is repeated but omitting the wetting agent (Nacconol NR) from the chlorite solutions of each of Tests B and D. No material differences in results are obtained.

EXAMPLE 5

This example illustrates the results obtained when a single bath containing chlorite and oxalic acid is used instead of individual baths in accordance with the invention. The gelled tow is the same copolymer composition as that of Example 1. The results are tabulated in Table III.

*Table III*

| Test | Treatment | Yellowness, Original |
|---|---|---|
| G | None; air-dried | 0.134 |
| H | Single bath of an aqueous solution having a pH of 3 and containing 0.5% Textone and 1 g./l. oxalic acid; water-washed; and finally air-dried. | 0.095 |
| I | Treatment first in an aqueous solution acidified to a pH of 4 with acetic acid and containing 0.5% Textone; water-washed; then in an aqueous solution containing 1 g./l. oxalic acid; water-washed; and finally air-dried. | 0.061 |

The results show the non-equivalency of the single-bath treatment exemplified by Test H with the procedure of this invention.

EXAMPLE 6

This example illustrates the use of other concentrations of Textone and other bath temperatures and treating periods, and also color-value data on the products after heating for only ½ hour at 112° C. The gelled tow is a different sample made from the acrylonitrile copolymer of Example 1. The procedures and conditions are briefly as follows:

J. No treatment; gelled tow is merely air-dried.

K. Treatment for 10 minutes in a 30° C. aqueous solution acidified to a pH of about 3 with acetic acid and containing 0.6% Textone; washed with water; treatment for 10 minutes in a 50° C. aqueous solution containing 1 g./l. of oxalic acid; washed with water; and finally air-dried.

L. Treatment for 10 minutes in a 50° C. aqueous solution acidified to a pH of about 3 with acetic acid and containing 0.6% Textone; washed with water; boiled at 100° C. for 10 min. in an aqueous solution containing 1 g./l. of oxalic acid; washed with water; and finally air-dried.

The results are tabulated in Table IV.

Table IV

| Test | Brightness | | Yellowness | |
|---|---|---|---|---|
| | Original | After heating for ½ hour at 112° C. | Original | After heating for ½ hour at 112° C. |
| J | 73.1 | 70.5 | 0.199 | 0.229 |
| K | 74.9 | 72.3 | 0.135 | 0.152 |
| L | 75.9 | 74.2 | 0.048 | 0.106 |

The results given in Table IV show that the color improvement attainment by the treatment is very substantial, especially in the values for yellowness both originally and after the described heat treatment.

In practicing the present invention washing of the gelled article following the treatment with the chlorite solution is generally effected at room temperature (20°–30° C.). It is preferably continued until the article does not liberate iodine from a KI solution acidified with acetic acid. If the final bleaching treatment is effected with an oxalic acid solution, in some cases it may be unnecessary to wash the resulting fiber prior to further processing. The treated fiber is preferably squeezed of excess fluid, e. g., to 90–120% wet-pickup, prior to any washing steps that are given after one or both of the bleaching treatments.

I claim:

1. The process of removing color from a freshly extruded polymeric article, produced by a wet process and containing inherent, normally occurring discolorations, said article being in one of the following forms: filaments, staple fibers, rods, tubes, films, ribbons, sheets, the liquid phase of which article is comprised of water and the solid phase of which is composed essentially of a polymer of acrylonitrile containing, combined in the polymer molecules, at least 80% by weight of acrylonitrile and up to 20% by weight of a compound which is copolymerizable with acrylonitrile and which contains a single $CH_2=C<$ grouping, said process comprising subjecting the said article to treatment by immersion in two different kinds of baths, one of which consists essentially of an aqueous solution, acidified to a pH of from 2 to 6, of a water-soluble chlorite selected from class consisting of chlorous acid, alkali-metal chlorites, alkaline-earth metal chlorites, zinc chlorite, cadmium chlorite and nickel chlorite, said chlorite being present in said aqueous solution in a concentration of from 0.07% to about 2% by weight thereof, and the other of which baths consists essentially of an aqueous solution of oxalic acid in a concentration of from 0.02% to about 2% by weight thereof, each of said baths being at a temperature of from 20° C. to 100° C.; and washing the article after removal from one of said baths and prior to immersion in the other of said baths, the article being immersed in each of said baths for a total time sufficient to effect bleaching thereof as evidenced by the lighter color cf the dried article.

2. A process as in claim 1 wherein the water-soluble chlorite is sodium chlorite.

3. A process as in claim 1 wherein the liquid phase of the freshly extruded polymeric article is composed essentially of water.

4. A process as in claim 1 wherein the defined freshly extruded article is first immersed in a bath of the specified aqueous solution of the defined water-soluble chlorite, washed after removal from said bath, and thereafter immersed in a bath of the specified aqueous solution of oxalic acid.

5. A process as in claim 4 wherein the water-soluble chlorite is sodium chlorite.

6. The process of removing color from a freshly extruded article in aquagel state and containing inherent, normally occurring discolorations, said article being in one of the following forms: filaments, staple fibers, rods, tubes, films, ribbons, sheets, and the solid phase of which is composed essentially of a polymer of acrylonitrile containing, combined in the polymer molecules, at least 80% by weight of acrylonitrile and up to 20% by weight of a compound which is copolymerizable with acrylonitrile and which contains a single $CH_2=C<$ grouping, said process comprising immersing the said article in a first treating bath consisting essentially of an aqueous solution, acidified to a pH of from 2 to 6, of sodium chlorite in a concentration of from 0.07% to 2.0% by weight thereof, washing the said article with water after removal from the said bath, immersing the washed article in a second treating bath consisting essentially of an aqueous solution of oxalic acid in a concentration of from 0.02% to 2% by weight thereof, each of said baths being at a temperature within the range of from about 40° C. to about 80° C., and the article being immersed in each of said baths for a total time sufficient to effect bleaching thereof as evidenced by the lighter color of the dried article.

7. A process as in claim 6 wherein the aqueous solution constituting the first treating bath is acidified with acetic acid.

References Cited in the file of this patent

UNITED STATES PATENTS

| 2,629,711 | Stanin | Feb. 24, 1953 |
| 2,689,195 | Martone | Sept. 14, 1954 |

OTHER REFERENCES

Am. Dyestuff Reporter, 41:26, p. 890.

Am. Dyestuff Reporter, Feburary 16, 1953, pp. P99 and P100.

Papers of the Am. Assn. of Textile Technologists, p. 232, December 1950.